March 31, 1953     B. F. GREENE, JR     2,633,568
CRAFT IDENTIFICATION DEVICE
Filed Dec. 10, 1945
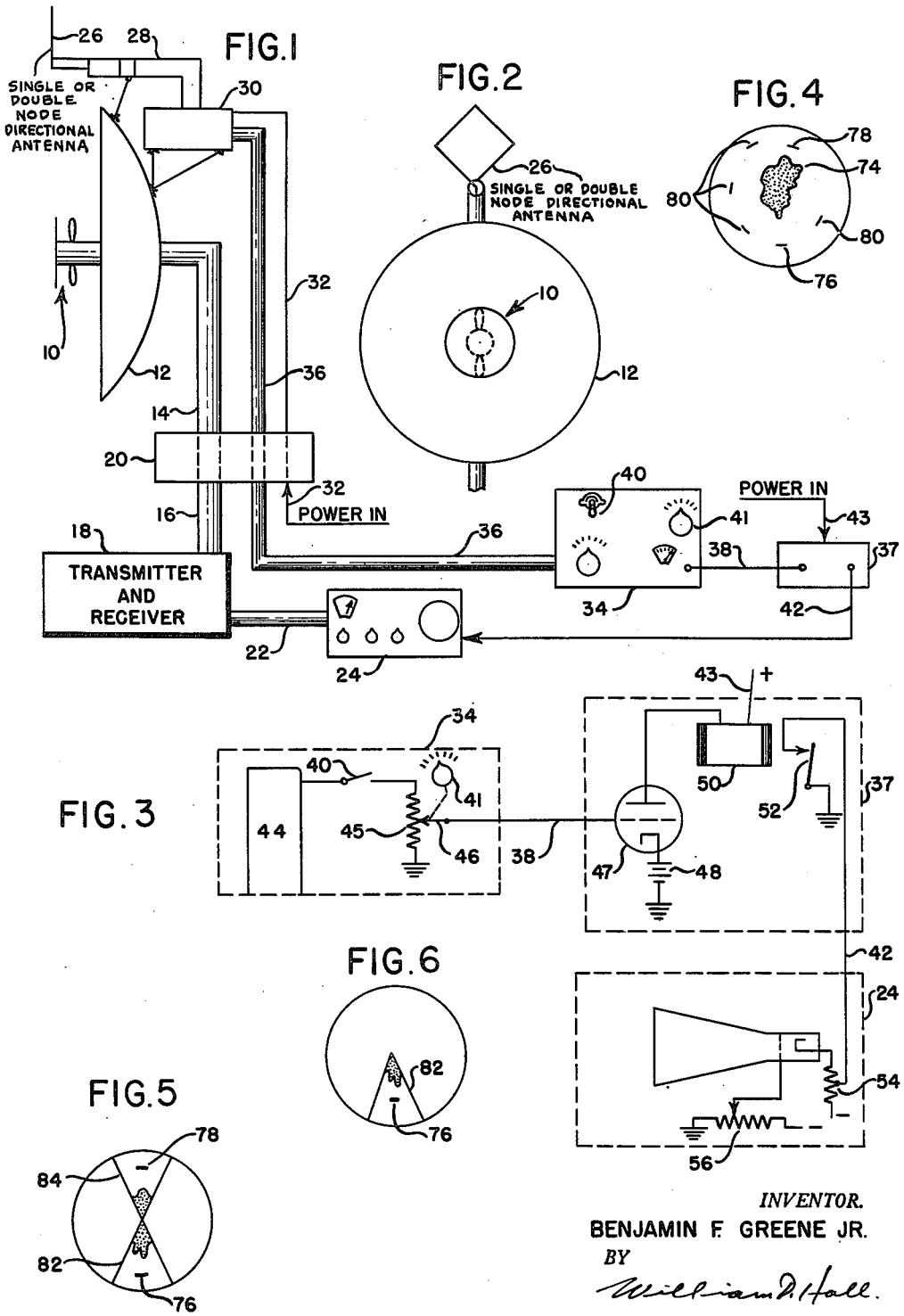
INVENTOR.
BENJAMIN F. GREENE JR.
BY
*William D. Hall*
ATTORNEY

UNITED STATES PATENT OFFICE 2,633,568

CRAFT IDENTIFICATION DEVICE

Benjamin F. Greene, Jr., Brighton, Mass., assignor, by mesne assignments, to the United States of America as represented by the Secretary of War Application December 10, 1945, Serial No. 634,082

5 Claims. (Cl. 343—11)

This invention relates to electrical apparatus and more particularly to apparatus operating in conjunction with a radio object locating system for the identification of aircraft by radio.

In areas surrounding landing fields and other landing areas, such as the decks of aircraft carriers or seaplane landing areas, it is necessary to have one or more men act as traffic directors to prevent collision of aircraft in the air or on the landing area. These traffic directors direct the flight of the aircraft in that area so that landings and take-offs may proceed in an orderly manner at a rapid rate. In order to properly perform their duties, it is necessary for the traffic directors to be able to identify individual planes within that area.

If a traffic director is provided with a radio object locating radar system that employs a plan position indicator, he has no difficulty in identifying aircraft within his area provided that no more than one or two aircraft are in the area at one time. It becomes difficult, however, to identify the aircraft when several target indications appear on the plan position indicator. Solutions to this problem that have been advanced in the past include having the aircraft that is to be identified drop a packet of metal foil, known in the radar art as "window," at a time specified by the traffic director. This metal foil causes a distinctive indication to appear on the plan position indicator. The disadvantages of this method are, first, that aircraft are required to carry packages of the metal foil for identification purposes and, second, that the particular aircraft dropping the "window" is difficult to locate on the plan position indicator when there are several planes in the immediate vicinity of the plane to be identified. Other solutions include the use of beacon and IFF "identification, friend or foe" systems. In these latter systems a radio apparatus known as a transponder, located in the aircraft, transmits an identifying signal or code upon receipt of a transmitted signal from the radio object locating system. This identifying signal may be indicated on the plan position indicator at a point adjacent to the indicated location of the plane to be identified. This system requires special equipment to be installed in the aircraft, and, therefore, it is undesirable for general use. Other methods of identification have been developed that require additional personnel or additional equipment or both and hence are impractical in many installations.

It is an object of the present invention, therefore, to provide a simple, novel method of identifying the aircraft by radio.

It is a further object of this invention to provide an identifying system that requires no additional personnel, no additional equipment in the aircraft to be identified provided that the aircraft is equipped with radio communication, and only a minimum of additional equipment at the control station.

For a better understanding of the invention, together with other and further objects thereof, reference is had to the following description taken in connection with the accompanying drawing in which:

Fig. 1 is a schematic drawing of the present invention;

Fig. 2 is a front view of the antenna portion of this invention;

Fig. 3 is a schematic wiring diagram of certain portions of this invention;

Fig. 4 is a view of a typical pattern upon the plan position indicator, with the identification circuit inoperative; and Figs. 5 and 6 are views of the plan position indicator with the identifying circuit in operation.

Reference is now had more particularly to Fig. 1 of the drawing for a detailed description of the present invention. In Fig. 1 there are shown an antenna 10 and reflector 12 of a radio object locating system. Antenna 10 may be connected by means of radio frequency transmission lines 14 and 16 to the transmitter and receiver component 18 of a radio object locating system. Transmission lines 14 and 16 are joined by a rotatable coupling 20. Joint 20 provides by conventional means the necessary elements to rotatably connect at least two radio frequency transmission lines and at least one low frequency line between the antenna 10, which may rotate through 360° or more in azimuth, and other circuit components that are normally stationary. Component 18 may be connected by an electrical cable 22 to a plan position indicator 24 that forms a part of the radio object locating system. The above mentioned radio object locating system may be any one of the various types that are known in the art. A directional loop antenna 26 may be connected by a radio frequency transmission line 28 to a radio frequency amplifier 30. Antenna 26 and amplifier 30 are rigidly mounted on reflector 12 and rotate with this scanning reflector as the radio object locating system searches an area in space.

Referring now to Fig. 2, there is shown a front view of antenna 10, reflector 12, and antenna 26 taken in a plane perpendicular to the axis of reflector 12. The axis of loop antenna 26 is in the same direction as that of reflector 12, the plane defined by the loop being perpendicular to the axis of reflector 12.

Referring again to Fig. 1, power may be supplied to amplifier 30 by means of a connection 32 that passes through rotatable coupling 20, while signals from amplifier 30 are applied to a communication receiver 34 through a radio frequency transmission line 36. Rotatable coupling 20 as stated above contains means, for example slip rings and rotating joints, to permit communication receiver 34, normally fixed in position, to be connected to amplifier 30 which rotates with antennas 10 and 26 about a fixed axis. A control voltage proportional to the average intensity of communication signals received by receiver 34 is applied to a relay control circuit 37 by means of lead 38. A switch 40 on receiver 34 provides means for disconnecting the control voltage from control circuit 37, while a knob 41 provides means for adjusting the amplitude of the control voltage. The output of relay control circuit 37 is connected to an intensity control circuit in indicator 24 by means of a connection 42. Power is supplied to the relay control circuit 37 by means of a lead 43 also marked "power in."

Referring now to Fig. 3, there is shown an embodiment of a circuit for controlling the intensity of the plan position indicator 24. Dashed blocks 24, 34 and 37 represent respectively the plan position indicator, the communication receiver, and the relay control circuit of Fig. 1. In Fig. 3, the block 44 shown within dashed block 34 represents a long time constant detector circuit similar to the type of detector circuit normally employed for automatic volume control circuits. The output of detector 44 may be applied through switch 40 to one terminal of a potentiometer 45, the other terminal of which may be maintained at a point of fixed reference potential, in this case ground potential. A tap 46 on potentiometer 45, the position of which is controlled by knob 41, is connected by lead 38 to the control grid of an amplifier tube 47 in relay control circuit 37. The cathode of tube 47 may be held at a positive potential by means of a potential source 48 so that no plate current flows in tube 47 until the control grid of this tube reaches a predetermined potential. A relay 50 may be connected in the anode circuit of tube 47. Contacts 52 of relay 50 are normally open but are closed when relay 50 is energized. When contacts 52 are closed, ground potential is applied to lead 42. Lead 42 is connected to a tap on a resistor 54 in the circuit of indicator 24. Resistor 54 is connected from the cathode of a cathode ray tube in indicator 24 to a point of negative potential. The intensity grid of this cathode ray tube is controlled by a potentiometer 56 connected between a source of negative potential and ground.

It should be understood that the circuit shown in Fig. 3 for controlling the intensity of a cathode ray tube in response to received signals is merely illustrative and that this invention is not limited to this particular circuit but rather embraces this circuit and circuits having similar functions.

Reference is now had to the operation of the present invention. The radio object locating system which in this case includes antenna 10, transmitter-receiver component 18, and indicator 24, may be caused to search an area in space in the normal manner (switch 40 in an "off" position). The "picture" that appears on the screen of indicator 24 may be as shown in Fig. 4. The shaded area 74 represents echo returns from nearby ground targets, while indications 76, 78, and 80 may represent echoes returned from aircraft within the area under the control of the traffic director (the plan position indicator "picture," in this example, is made to correspond to the limit of control of the traffic director). An aircraft represented by indication 76 may contact the traffic director for direction. From the initial radio contact the traffic director cannot tell which of the indications on the screen represents the calling aircraft. Switch 40 which has thus far been in the off position may be thrown to the "on" position. The screen of indicator 24 may then appear as shown in Fig. 5, indicating two sectors if antenna 26 is a simple loop. All indications on the screen of indicator 24 are blanked out except for a small sector 82 and a reciprocal sector 84. Sector 82 contains the calling aircraft as shown by indication 76. In most practical cases there will be no indications in the reciprocal sector 84, but for completeness of operation description, an aircraft indication 78 may be assumed in this sector. The traffic director may distinguish which of the two aircraft is being communicated with by by means of a "sensing antenna" (not shown). Sensing antennas are well known in the art and have been in use for many years.

The manner in which indications in the undesired sectors on the screen of indicator 24 are blanked out is best understood by reference to Fig. 3. Radio signals from the calling aircraft are detected in detector 44. A voltage that is proportional to the average intensity of the received communication signals taken over a short period of time is supplied to potentiometer 45. This voltage will vary between a maximum value occurring when the axis of reflector 12 and hence the axis of antenna 26 make an angle of approximately 90° with the direction of the calling aircraft, and a minimum value occurring when the axis of antenna 26 makes an angle of approximately zero degrees with the direction of the calling aircraft. If antenna 26 is a simple loop antenna, there are two maximum and two minimum points in 360 degrees of rotation of reflector 12. Tap 46 on potentiometer 45 may be adjusted by means of knob 41 until the potential supplied to the grid of tube 47 is sufficient to cause the relay contacts 52 to be held closed except during the times that reflector 12 sweeps through the small sector including the target, and through the reciprocal sector. During the time that contacts 52 of relay 50 are closed, the negative bias normally present on the cathode of the cathode ray tube in indicator 24 is shunted to ground. The potential on the intensity grid of the cathode ray tube is adjusted by means of potentiometer 56 so that target indications appear on the screen of indicator 24 when contacts 52 are open, and no indications appear when contacts 52 are closed. It can be seen that no potential is supplied to potentiometer 45 when switch 40 is open; therefore, contacts 52 will remain open at all times that switch 40 is open.

If antenna 26 is a one-null loop rather than the simple loop described above, the signal supplied by antenna 26 will drop to a minimum at only one point in a complete circle of rotation. This minimum point occurs when the axis of the one-null loop is pointed at the source of signals. Using such a one-null loop, the screen of indicator 24 will have only one illuminated sector 82 as indicated in Fig. 6. The width of sector 82 may be controlled by adjusting the detector output supplied to amplifier tube 47 in relay control circuit 37. In practice, the width of sector 82 may be reduced until only a single aircraft indication 76 appears in this sector. Indication 76, therefore, is identified as the calling aircraft. The one-null loop used in this antenna may be a banked loop antenna that has only one null in the field pattern, or it may be any of the combinations of a simple loop antenna and other directional or non-directional antennas that are known in the art.

In addition to identifying a calling aircraft, this system provides means for concentrating attention on flight of the selected aircraft so long as it continues to transmit communicaiton signals. The sector on the screen of the indicator automatically follows the movement of the transmitting aircraft on the screen of the indicator. The width of the sector may increase as the aircraft approaches antenna 26, and decrease as the aircraft recedes from antenna 26, due to the increase and decrease respectively in the strength of the received signal.

To provide a more flexible system of operation, several directional loop antennas may be mounted on reflector 12 with each antenna or the receiver circuit fed thereby responsive to a different frequency. Separate indicators can then be made selectively responsive, thus permitting the identification of several aircraft simultaneously. The traffic director may have a master indicator on which all targets appear. As individual planes are contacted, they are assigned a transmitting frequency. The indicator corresponding to a selected antenna tuned to that frequency may then be adjusted in the manner described above to identify the calling aircraft. While a radio object locating system equipped with a plan position indicator has been described in the preferred embodiment of this invention for identifying aircraft, systems employing other types of indicators may be utilized. The described system may of course be used to identify objects other than aircraft, for example ships or other moving surface craft or stationary objects.

While there has been described what is at present considered the preferred embodiment of the invention, it will be obvious to those skilled in the art that various changes and modifications may be made therein without departing from the invention.

What is claimed is:

1. A system for identifying a selected craft transmitting signals, comprising a radio object-locating system having a scanning directional antenna array, a transmitter and receiver component coupled to said array for transmitting a beam of exploratory pulses and receiving echo pulses from reflected objects and a cathode ray indicator means coupled to said transmitter and receiving component and to said array for presenting a display of said reflecting objects as a function of their respective angular and range coordinates with respect to the position of said radio object locating system; a directional radio antenna oriented with its position of minimum sensitivity in the direction of said beam, means for scanning said radio antenna in synchronism with said antenna array, whereby the magnitude of signals received from said selected craft by said radio antenna is determined by the direction of said beam with respect to the direction of said selected craft and reaches a minimum when said directed beam is pointed toward said selected craft, a detector circuit for providing a voltage varying with the magnitude of signals received from said selected craft by said radio antenna, a normally inoperative intensity control circuit which is rendered operative by a voltage having at least a predetermined amplitude, means connecting said intensity control circuit between said detector circuit and said indicator means to abruptly change the intensity of the display on said indicator means when the amplitude of the detected voltage exceeds said predetermined amplitude, to thereby delineate the area of the display on said indicator means which is in the vicinity of said selected craft.

2. Apparatus as described in claim 1, in which said intensity control circuit comprises a voltage amplifier with a relay in the anode circuit thereof, said voltage amplifier circuit energizing said relay voltage of predetermined amplitude is applied thereto.

3. A device for identifying a selected craft transmitting signals for use with a radio object-locating system employing transmitting and receiving means including a scanning antenna producing a directive beam and means including a cathode ray indicator means coupled to said transmitting and receiving means for displaying objects as a function of their respective spatial polar coordinates with respect to the position of said radio object-locating system; said device comprising a directional radio antenna rotated in synchronism with the scanning antenna and so oriented that a limit point of sensitivity is in the direction of said directive beam, whereby the magnitude of signals received from said selected craft by said radio antenna is determined by the direction of said directive beam with respect to the direction of said selected craft and reaches a limit when said directive beam is pointed toward said selected craft, and means connected between said radio antenna and said indicator means for abruptly changing the intensity of the display on said indicator means during the portion of each scan in which the magnitude of said received signal is greater than a predetermined magnitude, to thereby delineate the area of the display on said indictaor means which is in the vicinity of said selected craft.

4. A device according to claim 3, wherein said directional radio antenna is oriented with its position of minimum sensitivity in the direction of said directive beam, and wherein said last-named means includes a detector circuit for providing a voltage varying with the magnitude of signals received from a selected craft by said radio antenna, and a normally inoperative intensity control circuit which is rendered operative by a voltage having at least a predetermined amplitude, said intensity control circuit being connected between said detector circuit and said indicator.

5. A device according to claim 4, in which said intensity control circuit comprises a voltage amplifier with a relay in the anode circuit thereof, said voltage amplifier circuit energizing said relay when said voltage of predetermined amplitude is applied thereto.

BENJAMIN F. GREENE, Jr.

REFERENCES CITED

The following references are of record in the file of this patent:

UNITED STATES PATENTS

| Number | Name | Date |
|---|---|---|
| 2,156,809 | Frederickson | May 2, 1939 |
| 2,407,199 | Wolff | Sept. 3, 1946 |
| 2,408,048 | Deloraine | Sept. 24, 1946 |
| 2,414,431 | Alford | Jan. 21, 1947 |
| 2,421,747 | Engelhardt | June 10, 1947 |